United States Patent [19]

Rosenbaum

[11] 4,028,677
[45] June 7, 1977

[54] DIGITAL REFERENCE HYPHENATION MATRIX APPARATUS FOR AUTOMATICALLY FORMING HYPHENATED WORDS

[75] Inventor: Walter Steven Rosenbaum, Silver Spring, Md.

[73] Assignee: International Business Machines Corporation, Armonk, N.Y.

[22] Filed: July 16, 1975

[21] Appl. No.: 596,337

[52] U.S. Cl. .......................................... 340/172.5
[51] Int. Cl.$^2$ ..................... G06F 5/00; G06K 15/18
[58] Field of Search ........... 340/172.5; 235/151.22; 234/4, 7, 8; 444/1; 197/84 A

[56] References Cited

UNITED STATES PATENTS

| | | | |
|---|---|---|---|
| 3,439,341 | 4/1969 | Dolby et al. | 340/172.5 |
| 3,529,296 | 9/1970 | Friedman et al. | 340/172.5 |
| 3,537,076 | 10/1970 | Damerau | 340/172.5 |
| 3,550,091 | 12/1970 | Colgan et al. | 340/172.5 |

*Primary Examiner*—Melvin B. Chapnick
*Attorney, Agent, or Firm*—John W. Henderson, Jr.

[57] ABSTRACT

Apparatus for automatic hyphenation of input words from a word processing system. The apparatus includes a digital reference matrix memory containing a vector representation of all legal hyphenations for each dictionary word in the form of a calculated magnitude and associated unique vector angles. The vector magnitude constitutes the address data for accessing the memory. When an input word is received for hyphenation, a hyphen is added to the word and its magnitude is calculated. The memory is accessed for an address which equals the calculated magnitude. If the address is not found, a signal is generated indicating that the word cannot be legally hyphenated. If the address is found, then the corresponding angles, representing legal hyphenations of the input word, are compared with test words generated by sequentially inserting hyphens in the input word. All equal compares are flagged and the corresponding hyphenated input words are gated onto the output line.

5 Claims, 2 Drawing Figures

DIGITAL REFERENCE HYPHENATION MATRIX APPARATUS FOR AUTOMATICALLY FORMING HYPHENATED WORDS

BACKGROUND OF THE INVENTION

1. Field of the Invention

The invention disclosed herein relates to data processing devices and more particularly relates to the automatic hyphenation of words in a word processing system.

2. Description of the Prior Art

One of the most formidable problems to overcome in any text-processing application involving line justification is that of dividing words into component syllables, or hyphenation. The ability to divide words allows a text-processor to add syllables of a word to a line of text in order to meet justification requirements rather than forcing the line to end with a complete word. Hyphenation is normally a necessity if graphic composition standards are to be maintained, especially when high ratios of point size to column measure are used in text composition.

In the prior art a technique for word division consists of storing all commonly used words with their associated hyphen points and then searching this huge dictionary each time a word is to be hyphenated. Assuming that the hyphen points for each word in the dictionary were correctly stored, this technique has the advantage of hyphenating correctly each word that is found in the dictionary. However, the primary disadvantage is that storage requirements and execution time are prohibitively large unless a large scale computer system is used.

OBJECTS OF THE INVENTION

It is a primary object of this invention to automatically hyphenate dictionary words more efficiently and more economically than was heretofore possible.

SUMMARY OF THE INVENTION

These and other objects of the invention are accomplished by providing a digital reference hyphenation matrix apparatus. The apparatus includes a memory containing digital representations of the vector magnitude and angles for each valid hyphenation of a dictionary word. The digital representations are determined in accordance with the alpha word vector representation (AWVR) formula disclosed in U.S. Pat. No. 3,995,254, entitled "Digital Reference Matrix for Word Verification," issued Nov. 30, 1976 to W.S. Rosenbaum, and assigned to the same assignee as the present application.

The apparatus receives a word to be hyphenated at its input, adds a hyphen to the word, and converts the word into its magnitude attributes in accordance with the AWVR. The magnitude serves as an address which is compared to the addresses in the memory. If an equal compare occurs, the angles which correspond to the address are read out of the memory into an angle storage buffer. The apparatus then inserts hyphens in the input word in a sequential manner following detection of the first vowel. These hyphenated test words are used to generate a series of corresponding test angles. The generated test angles are stored in a test word angle buffer and compared to the angles read out from the memory. Any equal compares between the test angles and the stored angles generate flags which are decoded and used to gate the corresponding test words out of the hyphenation test word buffer onto the output line of the apparatus. The hyphenated words thus generated may be used by the input device as all the legal hyphenation possibilities for line justification.

DESCRIPTION OF THE PREFERRED EMBODIMENT

Theory

Figure 1:
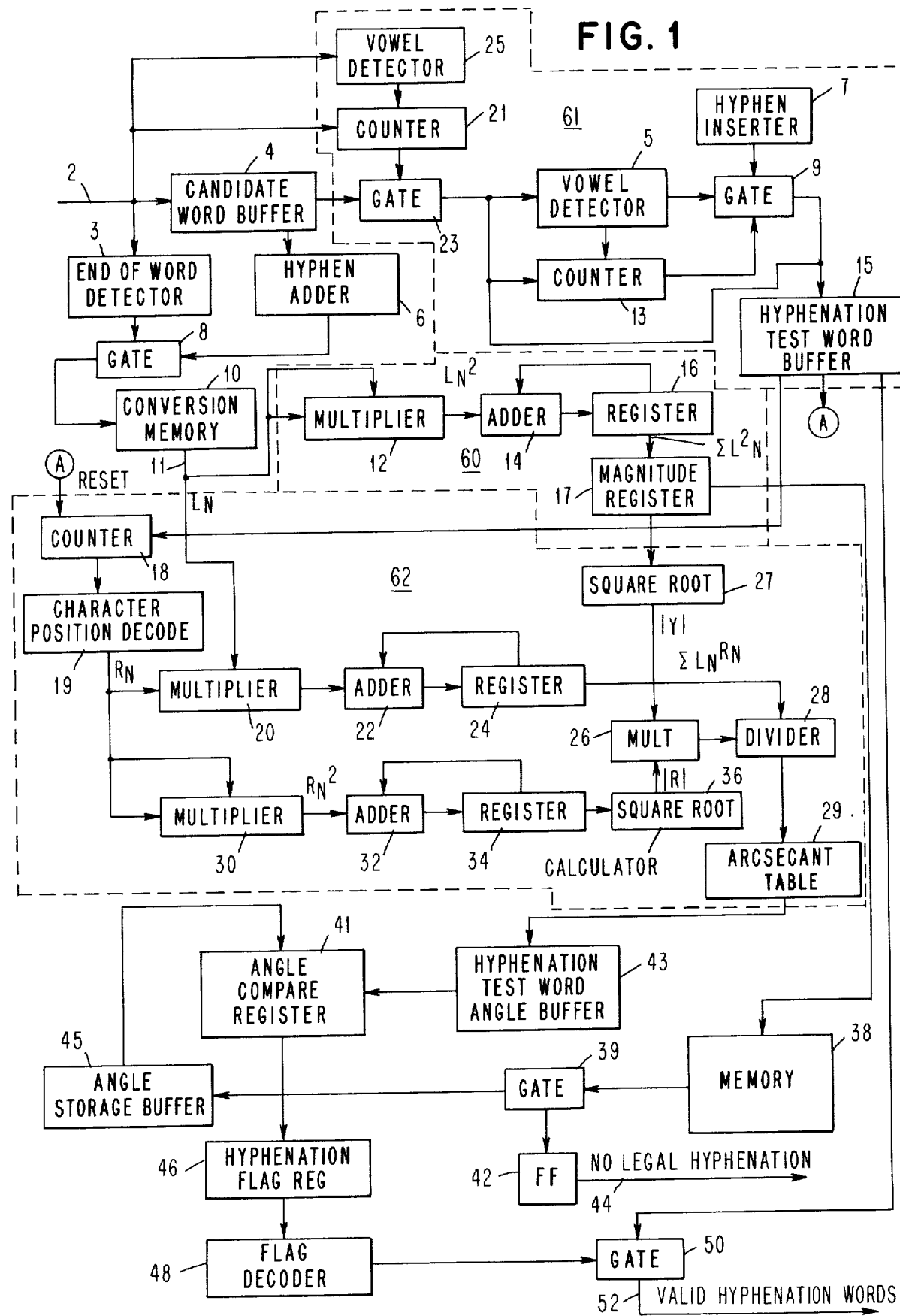
FIG. 1 shows the digital reference hyphenation matrix apparatus of this invention.

The digital reference hyphenation matrix (DRHM) approach was conceived as a highly efficient, low-storage approach to automatic hyphenation of words in a word processing system. Logically, the DRHM contains a representation in some manner of all legal hyphenations of words which might be anticipated in the word processing system. THe DRHM is a specialized application of the digital reference matrix disclosed in copending U.S. Pat. No. 3,995,254, entitled "Digital Reference Matrix for Word Verification," issued Nov. 30, 1976 by W. S. Rosenbaum. The technique disclosed in Rosenbaum is modified by defining the hyphen as a valid character.

The DRHM is made up of the magnitude/angle duet generated by applying the alpha word vector representation (AWVR) technique shown in Table 1 to the hyphenation dictionary. The AWVR technique is fully disclosed in Rosenbaum, referenced above, and will not be elaborated herein.

Table 1.

Numeric Extraction of Alpha Field $A = 1, B = 2, C = 3, D = 4, E = 5, F = 6,$
$G = 7, H = 8, I = 9, J = 10, \ldots, Z = 26$ Step 1

Vector Mapping CORNWALL $\longrightarrow$ (3, 15, 18, 14, 23, 1, 12, 12)

Step 2

Vector Attributes (3, 15, 18, 14, 23, 1, 12, 12) $\longrightarrow$ Magnitude,

Angle Magnitude = Function of Characters in Word $$\sum_{N=1}^{M} L^2 = (3)^2 + (15)^2 + (18)^2 + (14)^2 + (23)^2 + (1)^2 + (12)^2 + (12)^2 = 1572 = Y^2$$

Angle = Function of Character Position

Table 1.-continued

Numeric Extraction of Alpha Field $$= \sec^{-1} \frac{|Y||R|}{\Sigma L_N R_N} = 83.7392 \text{ Degree}$$

where R is the reference vector for each word length (M) comprising an "N"-tuple of linearly independent terms corresponding to the position of each letter in the word e.g., $\sqrt{2}$, $\sqrt{3}$, $\sqrt{5}$, $\sqrt{6}$,... J or log 3, log 5, log 7, log 11,..., log K, where J is irrational and K is a prime number, and with $$|R| = \sqrt{(\sqrt{2})^2 + (\sqrt{3})^2 + (\sqrt{5})^2 + \ldots + (\sqrt{J})^2}, \text{ etc.}$$

Since the hyphen is considered as a legal character with a numeric value assigned, no matter where the hyphen resides in a word, the word's magnitude value remains unchanged. This follows from the magnitude being just a sum of integers, and hence, the order of summation is immaterial. The angle, however, changes uniquely based on the location of the hyphen within a word. Hence, all hyphenation possibilities for a given word are stored in one row of the memory 38 in FIG. 2 by using the magnitude as an address and storing all the corresponding angles at the address.

DESCRIPTION OF APPARATUS

The digital reference hyphenation matrix apparatus is shown in FIG. 1. A word to be hyphenated enters candidate word buffer 4 over input line 2. An end of word detector 3 connected to input line 2 detects the end of the input word and activates gate 8 to pass the candidate word plus a hyphen from hyphen adder 6 into the conversion memory 10. The end of word detector 3 determines the end of word code from the input means connected to input line 2. For example, if the input means were a keyboard, then a space, tab, or carrier return would indicate the end of a word. End of word detectors are known in the prior art. An example of a suitable end of word detector which could be used in the present invention is disclosed in FIG. 5C and column 11 of U.S. Pat. No. 3,537,076, issued Oct. 27, 1970, to F. J. Damerau, assigned to the same assigness as the present invention and hereby expressly incorporated herein by reference. The hypen adder 6 contains a permanent representation of the hypen which it adds to the end of the input word from the canidate word buffer 4. The conversion memory 10 is a read only memory in the preferred embodiment which contains the alpha numeric equivalency scheme which relates the alphabetic characters and the hyphen with weighted numeric values as determined by the technique discussed under "Theory" and more fully disclosed in W. S. Rosenbaum referenced above. The numerical weighting value for a character N is designated $L_N$. The conversion memory 10 outputs the value $L_N$ on the data bus 11.

The accessing means 60 for addressing magnitude listings in the memory 38 comprises the multiplier 12, the adder 14, the register 16, and the magnitude register 17. The value of $L_N$ on the data bus 11 is squared in the multiplier 12 and added to the sum of previous squared values of $L_N$ in the alpha word under analysis by the adder 14 and register 16. The process of calculating the value of the sum of $L_N^2$ continues until all characters in the candidate word have been converted. At this time the final value of the sum of $L_N^2$ is loaded into magnitude register 17 as the address for the magnitude of the word in memory 38, based upon the values of $L_N$ assigned to the characters of which the input alpha word is composed.

Magnitude register 17 is connected to memory 38 and accesses memory 38 for an address equal to the calculated magnitude for the hyphenated candidate word. If no address in memory 38 is found which equals the magnitude in magnitude register 17, gate 38 sets flip-flop 42 to indicate on output line 44 that the input word cannot be validly hyphenated. If the contents of magnitude register 17 do match an address in memory 38, the angles stored at the address in memory 38 are passed by gate 39 into angle storage buffer 45. A read only memory is preferred for memory 38 but a random access memory can also be used.

Figure 2:
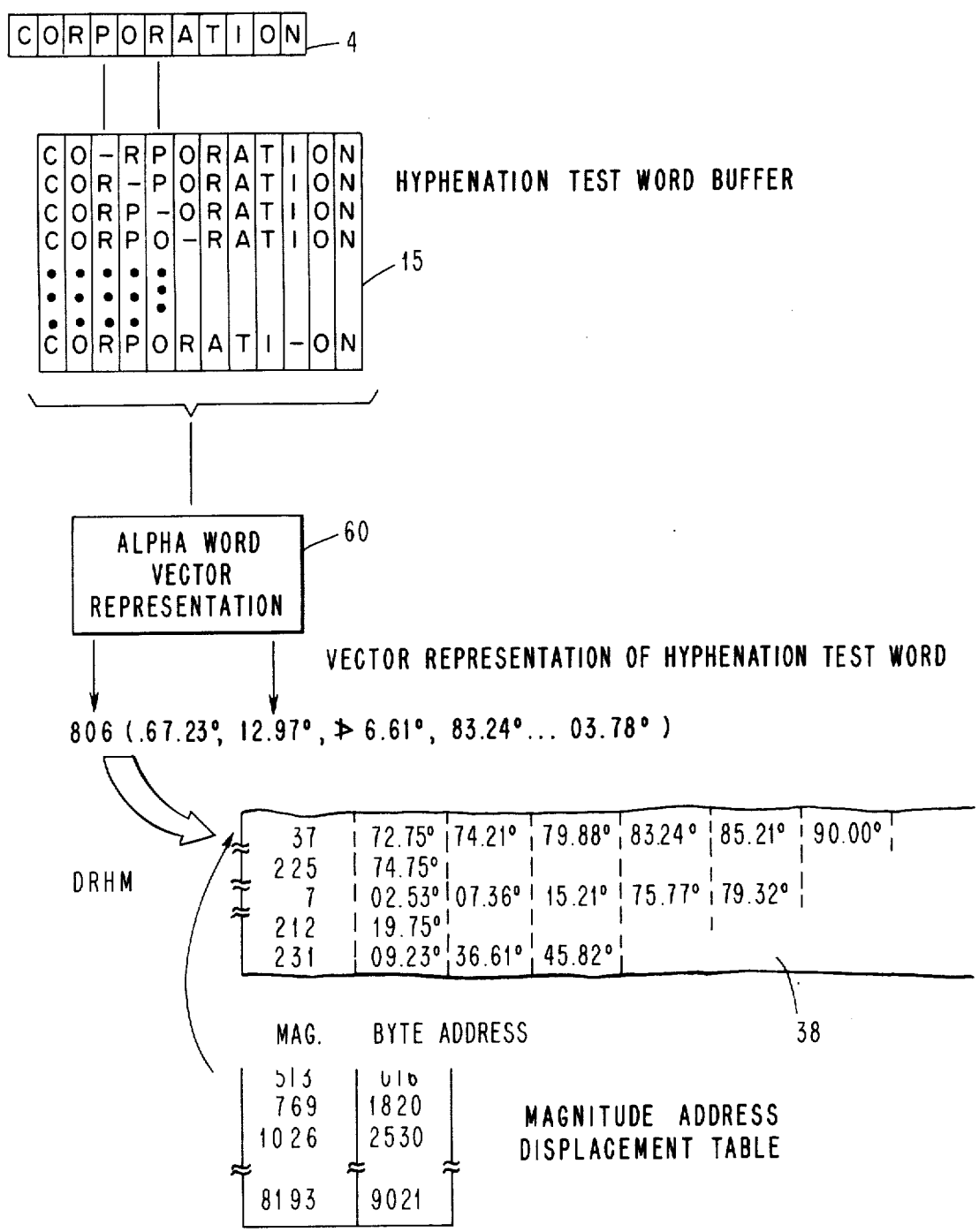
FIG. 2 is a block diagram showing the operation of the digital reference hyphenation matrix apparatus.

The hyphenation test word generator 61 comprises vowel detector 25, counter 21, gate 23, vowel detector 5, counter 13, hyphen inserter 7, gate 9, and hyphenation test word buffer 15. Vowel detector 25 is connected to input line 2 and detects the presence of the first vowel in the input candidate word. Vowel detector 25 activates counter 21 which counts the number of characters in the input word after the first vowel. Counter 21 activates gate 23 to pass the input word from candidate word buffer 4 to hyphenation test word buffer 15 in accordance with the count stored in counter 21. Vowel detector 5 is connected to the output of gate 23 and detects the presence of the first vowel in the input word during the first pass of the input word from candidate word buffer 4 to hyphenation test word buffer 15. Both vowel detector 5 and vowel detector 25 compare the letters on their input streams to the known vowels and produce an output when an equal compare occurs. For example, the vowel detectors may comprise a read only storage means and a comparator. An example of a suitable vowel detector, which is expressly incorporated herein by reference, is disclosed in Cols. 21-22 and FIG. 5b of Damerau. Vowel detector 5 activates gate 9 to insert a hyphen from hyphen inserter 7 into the input word following the first vowel. The hyphen inserter 7 contains a permanent representation of the hyphen which is present at its output at all times and can be accessed by operating gate 9. An example of a hyphen inserter in the prior art is shown in FIG. 5L and functionally described in column 20 of Damerau incorporated herein by reference above. Vowel detector 5 also activates counter 13 to store the character count up to the first vowel. On subsequent passes of the input word from candidate word buffer 4 to hyphenation test word buffer 15, counter 13 activates gate 9 to insert a hyphen from hyphen inserter 7 into the test word one character later than on the previous pass. Hyphenation test word buffer 15 in FIG. 2 shows an example of the contents of the hyphenation test word buffer after generation of test hyphenations for the word "corporation."

The angle calculation means 62 for the hyphenation test words comprises the counter 18, character position decode 19, multiplier 20, adder 22, register 24, multiplier 26, divider 28, arcsecant table 29, multiplier 30, adder 32, register 34, square root calculator 27, and square root calculator 36. The hyphenation test words are passed serially from hyphenation test word buffer 15 to counter 18. Counter 18 counts the position of the characters in the test word and causes character position decode 19 to output the present value of $R_N$ to the multiplier 20. The character position decode 19 decodes the position of the letter and the word to produce the predetermined value of R which corresponds to that position as discussed under Theory of Operation above. The counter 18 is reset to zero after each test word by the interword space code stored in the hyphenation test word buffer 15. Character position decodes are known in the prior art. For example, Damerau, incorporated by reference above, discloses such a character position decode in FIG. 5c with a functional description in column 24 thereof. The value of $R_N$ is a linearly independent number for each character position in the word. The value of $L_N$ on the date bus 11 is input to the multiplier 20 and multiplied times the present value of $R_N$ and the product is input to adder 22. Adder 22 and register 24 maintain the running sum of the products of $L_N$ times the $R_N$ for the test word under analysis. At the end of each test word, register 24 outputs the final sum of $L_N$ times $R_N$ to the divider 28. The present character position value $R_N$ is output from the character position decoder 19 to the multiplier 30 generating the value $R_N^2$ which is output to the adder 32. Adder 32 and register 34 maintain a running sum of the squares of $R_N$ and at the end of the test word the final sum of $R_N^2$ is output to the square root calculator 36. The square root calculator 36 takes the square root of the sum of the $R_N$ squares yielding the value $|R|$ which is input to the multiplier 26. Square root calculator 27 calculates the square root of the sum of $L_N^2$ to yield $|Y|$. In the preferred embodiment, the square root calculators 27 and 36 are implemented as hard wired arithmetic devices. However, it is understood that programmed computers may be substituted for the hard wired devices without altering the scope of the invention. For example, the IBM Systems Reference Library manual number GC28-6596-4 entitled "IBM System/360 Fortran IV Library Subprograms," copyrighted in 1966, contains programs for a general purpose computer which can be used to calculate the square root. The square root subprogram is called by inserting SQRT(X), where X is the term whose square root is to be taken. An example of a hard wired square root calculator of the type used in the present invention in the prior art is disclosed in column 64 and shown in FIG. 5N of Damerau incorporated herein by reference above. Multiplier 26 multiplies the value of the magnitude of Y times the magnitude of R from the square root calculator 36 and outputs the product as the numerator to the divider 28. The value of the sum of the $L_N$ times $R_N$ which is input from the register 24 to the divider 28 serves as the denominator and the calculated quotient is secant of the angle for the test word which output to the arcsecant calculator 29. In the preferred embodiment, arcsecant table 29 is a memory containing a reproduction of the secant-angle values from a standard trigonometry table and is used to look up the angle value corresponding to the secant value output by divider 28. The angle value output from the arcsecant table 29 is loaded into the hyphenation test word angle buffer 43. This calculation is repeated for each hyphenation test word in the hyphenation test word buffer 15.

After all the hyphenation test word angles have been calculated, the angles in hyphenation test word angle buffer 43 are compared to the angles in angle storage buffer 45, which contains the legal hyphenation angles for the word under test from memory 38, in angle compare register 41. Angle compare register 41 generates a hyphenation flag for each equal compare and outputs the hyphenation flags to angle flag register 46. A flag decoder 48 is connected to the output of hyphenation flag register 46 and detects which flags are set in the hyphenation flag register. The flags may be represented by binary bits. Flag decoder 48 decodes the hyphenation flags in hyphenation flag register 46 and activates gate 50 to pass the hyphenation test words which match the flags from hyphenation test word buffer 15 onto output line 52. Flag decoders of the type used herein are well known in the prior art. For example, see FIG. 5F and column 16 of Damerau incorporated herein by reference above. The hyphenated words on output line 52 are the legal hyphenations for the input word.

OPERATION

The operation of the automatic hyphenation insertion apparatus will be described with reference to FIGS. 1 and 2. A word to be hyphenated is received by the candidate word buffer 4 over input bus 2. Hyphen adder 6 adds a hyphen to the word and end of word detector 3 actuates gate 8 to pass the word plus the added hyphen to conversion memory 10. Conversion memory 10 serially outputs a numerical representation $L_N$ for each character in the word on bus 11. The value of $L_N$ on the data bus 11 is squared in multiplier 12 and added to the sum of previous squared values of $L_N$ by the adder 14 and register 16. The calculation of the value of $L_N^2$ continues until all characters in the candidate word have been converted. The final value of the sum of the $L_N^2$ is loaded into magnitude register 17 as the address for the magnitude of the candidate word in memory 38.

Magnitude register 17 accesses memory 38 for an address equal to the calculated magnitude for the hyphenated candidate word. If no corresponding address is found in memory 38, gate 39 sets flip flop 42 to indicate on output bus 44 that the input word cannot be validly hyphenated. If the contents of the magnitude register 17 do correspond to an address in memory 38, the angles stored at that address in memory 38 are passed by gate 39 to angle storage buffer 45. Additionally, if the memory 38 contains angles corresponding to the calculated magnitude for the candidate word indicating that the candidate may be validly hyphenated, a set of hyphenation test words is generated and their angles calculated for comparison with the angles stored in memory 38 in order to determine the valid hyphenation points of the candidate word. Vowel detector 25 detects the presence of the first vowel in the input candidate word and activates counter 21 to count the number of characters in the input word after the first vowel. Counter 21 activates gate 23 to pass the input word from candidate word buffer 4 to hyphenation test word buffer 15 a number of times equal to the number of letters in the word after the occurrence of the first vowel. Vowel detector 5 detects the presence of the first vowel in the input word during the first pass of the input word from candidate word buffer to hyphenation test word buffer 15 and activates gate 9 to insert a hyphen from hyphen inserter 7 into the input word following the first vowel. Vowel detector 5 also activates counter 13 to store the character count up to the first vowel. On subsequent passes of the input word from candidate word buffer 4 to hyphenation test word buffer 15, counter 13 activates gate 9 to insert a hyphen from hyphen inserter 7 into the test word one character later than on the previous pass. Hence, a set of test words is generated similar to the set of hyphenated test words for "corporation" in hyphenation test word buffer 15 of FIG. 2.

After all the possible hyphenation test words have been generated in hyphenation test word buffer 15, the hyphenation test words are passed serially from hyphenation test buffer 15 to counter 18. Counter 18 counts the position of the characters in the test word and causes character position decode 19 to output the character position value $R_N$ to multiplier 20. The output $R_N$ of the character position decode 19 for each character position in the input at the word is received by multiplier 20 and multiplied times the numerical representation for the corresponding character $L_N$ from conversion memory 10 and added by adder 22 to the contents of register 24 to provide a running sum of $L_N$ times $R_N$. Also, the letter position value, $R_N$, is input to multiplier 30 where it is multiplied times itself and added by adder 32 to the contents of register 34 to provide a running sum of the squares of $R_N$. For each of the test words in the hyphenation test word buffer 15, the final sum of $R_n^2$ is output to the square root calculator 36, the contents of the magnitude register 17 are output to square root calculator 27, and the contents of register 24 are output to divider 28. The square root calculator 36 calculates the square root of the sum of the $R_N$ squares yielding the magnitude of the vector R and the square root calculator 27 calculates the square root of the magnitude, which is the sum of the $L_N$ squares, yielding the magnitude of the vector Y. Multiplier 26 multiplies the magnitude of the vector R times the magnitude of the vector Y and outputs the product as the numerator to divider 28. The value of the sum of the $L_N$ times $R_N$ which has been input from register 24 to the divider 28 serves as the denominator to divider 28 which produces the secant of the angle for the word. The quotient is output to the arcsecant table 29 where the corresponding angle is looked up. For each of the hyphenation test words, the arcsecant table 29 contains an angle value for the secant from divider 28 and outputs the angle value to the hyphenation test word angle buffer 43.

After angle values have been determined and stored in hyphenation test word angle buffer 43 for all the hyphenation test words stored in hyphenation test word buffer 15, angle compare register 41 compares the value hyphenation angles stored in angle storage buffer 45 to the test word hyphenation angles stored in hyphenation test word buffer 43. A flag is generated for each equal compare and stored in hyphenation flag register 46. The contents of hyphenation flag register 46 are decoded by flag decoder 48 and activate gate 50 to pass the corresponding hyphenation test words from hyphenation test word buffer onto output bus 52. The hyphenated words on output bus 52 are the valid hyphenations for the output candidate word.

While in the preferred embodiment of the invention the complete set of hyphenated test word angles is generated and compared in parallel to the stored set of legal hyphenation angles, it is well understood that the hyphenated word angles could just as easily be compared serially with the stored set of legal hyphenation angles.

While the invention has been particularly shown and described with reference to the preferred embodiment thereof, it will be understood to the preferred embodiment thereof, it will be understood by those skilled in the art that the foregoing and other changes in form and detail may be made therein without departing from the spirit and scope of the invention.

I claim:

1. Apparatus for the automatic hyphenation of alpha words comprising:
   buffer means for receiving a word to be hyphenated;
   test word generator means connected to said buffer means for forming a set of hyphenated test words from the received word;
   conversion means connected to said test word generator means for converting said set of hyphenated test words into a set of vectors having a common magnitude and a plurality of absolutely unique angles;
   memory means containing vector representations for the set of legal hyphenations for a predetermined dictionary of words;
   comparison means connected to said conversion means and said memory means for comparing the vector representations for the set of hyphenated test words against the contents of said memory means; and
   selection means for selecting the hyphenated test words that compare equal to the contents of said memory means.

2. Apparatus for automatic hyphenation of alpha words comprising:
   buffer means for receiving an input word to be hyphenated;
   a hyphen adder connected to said buffer means for adding a hyphen to the input word;
   a conversion memory connected to said hyphen adder for encoding each character in the input word and the added hyphen into a numeric value;
   magnitude calculation means connected to said conversion memory for producing a vector magnitude $$Y^2 = \sum_{N=1}^{M} L_N^2$$

from the output of said conversion memory, where $L_N$ is the numeric value assigned to each character in the word and M is the total number of characters in the word;
   test word generator means connected to said buffer means for forming a set of hyphenated test words from the input word;
   angle calculation means connected to said test word generator means for encoding the set of hyphenated test words into a set of absolutely unique vector angles $$\theta = \sec^{-1} \frac{|Y||R|}{\sum_{N=1}^{M} L_N \cdot R_N}$$

where $R_N$ is a unique number indicating the position of each character in a test word and $|R|$ is a vector whose elements are $R_N$;

memory means containing vector representations for the set of legal hyphenations for a predetermined dictionary of words;

comparison means connected to said magnitude calculation means, said angle calculation means, and said memory means for comparing the calculated vector magnitude and the set of hyphenated test word vector angles against the contents of said memory means; and selection means for selecting the hyphenated test words that compare equal to the contents of said memory means.

3. The apparatus of claim 2 wherein said test word generator means includes a vowel detector for detecting the occurrence of the first vowel in the input word, a gate connected to said vowel detector, a hyphen inserted connected to said gate for inserting a hyphen in each word of the set of test words, a counter connected to the gate for determining the position in which the hyphen is inserted, and a buffer for storing the set of hyphenated test words.

4. A digital reference hyphenation matrix apparatus for hyphenating input alpha words comprising:

input storage means for receiving a word to be hyphenated;

a hyphen adder connected to said input storage means for adding a hyphen to the input word;

test word generator means connected to said input storage means for forming a set of hyphenated test words from the input word;

a conversion memory connected to said hyphen adder for encoding each character in the input word, including the added hyphen, into a numeric value;

magnitude calculation means connected to said conversion memory for converting the output of said conversion memory into a vector having a magnitude $$Y^2 = \sum_{N=1}^{M} L_N^2$$

where $L_N$ is the numeric value assigned to each character in the word and M is the total number of characters in the word;

angle calculation means connected to said test word generator means for converting said set of hyphenated test words into a set of absolutely unique vector angles $$\theta = \sec^{-1} \frac{|Y||R|}{\sum_{N=1}^{M} L_N \cdot R_N}$$

where $R_N$ is a unique number indicating the position of each character in a test word and $|R|$ is a vector whose elements are $R_N$;

memory means containing vector representations for the set of legal hyphenations for a predetermined dictionary of words;

accessing means connected to said magnitude calculation means and said memory means for determining if the calculated vector magnitude of the input word matches an address in said memory means;

flag means connected to said memory means for producing a signal indicating that the input word cannot be legally hyphenated if the calculated vector magnitude does not match an address in said memory means;

an angle storage buffer connected to said memory means for receiving the set of angles stored in said memory means at the address corresponding to the calculated vector magnitude if said calculated vector magnitude matches an address in said memory means;

angle compare means for comparing the set of angles in said angle storage buffer with the set of calculated vector angles for said hyphenated test words;

flag register means connected to said angle compare means for receiving flags from said angle compare means indicating equal comparions between said angle storage buffer contents and said calculated vector angles for said hyphenated test words; and a flag decoder connected to said flag register means for decoding the flags stored in said flag register means and gating the corresponding hyphenated test words from said hyphenated test word generator onto an output bus.

5. The apparatus of claim 4 wherein said test word generator means includes a vowel detector for detecting the occurrence of the first vowel in the input word, a gate connected to said vowel detector, a hyphen inserter connected to said gate for inserting a hyphen in each word of the set of test words, a counter connected to said gate for determining the position in which the hyphen is inserted, and a buffer for storing the set of hyphenated test words.

* * * * *